United States Patent
Kaidar

(10) Patent No.: US 7,885,220 B2
(45) Date of Patent: Feb. 8, 2011

(54) METHOD AND APPARATUS FOR IMPROVED DUAL CHANNEL OPERATION AND ACCESS POINT DISCOVERY IN WIRELESS COMMUNICATION NETWORKS

(75) Inventor: Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 11/840,444

(22) Filed: Aug. 17, 2007

(65) Prior Publication Data

US 2009/0046673 A1   Feb. 19, 2009

(51) Int. Cl.
*H04B 7/212* (2006.01)
*H04B 7/185* (2006.01)
*H04W 4/00* (2009.01)

(52) U.S. Cl. ........................ 370/321; 370/338; 370/347; 455/13.4

(58) Field of Classification Search ......... 370/310–311, 370/321, 328–332, 336, 338, 345–347, 350, 370/272–306, 445–462; 455/13.4, 127.1, 455/436–439, 522, 574
See application file for complete search history.

(56) References Cited

U.S. PATENT DOCUMENTS

| | | | |
|---|---|---|---|
| 6,515,970 B1 * | 2/2003 | Lindsay et al. ............... 370/280 |
| 7,050,452 B2 * | 5/2006 | Sugar et al. .................. 370/465 |
| 7,406,296 B2 * | 7/2008 | Haartsen ..................... 455/41.2 |
| 7,542,437 B1 * | 6/2009 | Redi et al. ................... 370/311 |
| 7,697,481 B2 * | 4/2010 | Rayzman et al. ............ 370/331 |
| 2007/0066329 A1 * | 3/2007 | Laroia et al. ................ 455/502 |
| 2007/0230401 A1 * | 10/2007 | Rayzman et al. ............ 370/331 |
| 2007/0238482 A1 * | 10/2007 | Rayzman et al. ......... 455/552.1 |
| 2007/0297438 A1 * | 12/2007 | Meylan et al. .............. 370/445 |
| 2008/0268863 A1 * | 10/2008 | Pedersen et al. ......... 455/452.2 |

* cited by examiner

*Primary Examiner*—Tri H Phan
(74) *Attorney, Agent, or Firm*—Cool Patent, P.C.; Joseph P. Curtin

(57) ABSTRACT

A method and apparatus of coordinating Time Division Multiple Access operation of wireless communication devices is disclosed. The method comprises an access point announcing a Quiet Period to one or more clients of the access point and transmitting as part of Target Beacons and probe responses an indication to the one or more clients that the access point will be absent from the communication channel for a period of time. The method also comprises the one or more clients establishing a connection with the access point after the Quiet Period when the access point is present on the communication channel on the basis of the indication.

21 Claims, 5 Drawing Sheets

METHOD AND APPARATUS FOR IMPROVED DUAL CHANNEL OPERATION AND ACCESS POINT DISCOVERY IN WIRELESS COMMUNICATION NETWORKS

FIELD OF THE INVENTION

Embodiments of the present invention relate generally to dual channel operation of wireless communication devices and access-point discovery in wireless communication networks.

BACKGROUND OF THE INVENTION

Wireless communication devices often need to simultaneously operate in more than one wireless communication network. For example, a wireless communication device may need to simultaneously operate in a Private Area Network Basic Service Set (PAN BSS) and a Wireless Local Area Network Basic Service Set (WLAN BSS). The networks typically implement one or more of the Institute of Electrical and Electronics Engineers (IEEE) 802.11 standard family of communications protocols, such as 802.11b, 802.11d, 802.11h or other variants.

In order to be perceived as simultaneously operating in both networks, the virtual Media Access Controls (MACs) of the wireless communication devices need to periodically operate in each of the networks. This involves leaving a first network for a second network while notifying the cell of its absence from the first network for a period of time. If the device is an Access Point (AP) for the network, it is assumed to always be available to the clients of the network. Therefore, if the AP is not available, the clients may disadvantageously assume that the AP has dropped out and the clients may commence a roaming procedure for a replacement AP.

All virtual MACs share the same physical layer (PHY), but may operate on different channels for various reasons, such as better spectrum/bandwidth utilization for multiple PANs. Sharing a common PHY requires the virtual MACs to operate in Time Division Multiple Access (TDMA) mode for multiple channel operation, wherein a wireless Network Interface Card (NIC) switches from one virtual MAC to another virtual MAC in a certain order.

When a virtual MAC is implementing an AP and working in TDMA mode, the virtual MAC will be available on the operating channel for only part of the time. When another station scans the channel for available networks, the station uses an active scan mode by sending a probe request and waiting for a probe response. The probe request can be sent on the channel even when the virtual MAC AP does not reside on the channel. However, this results in the drawback of the station taking longer to detect the AP or not detecting the virtual MAC AP in the channel at all.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Figure 1:
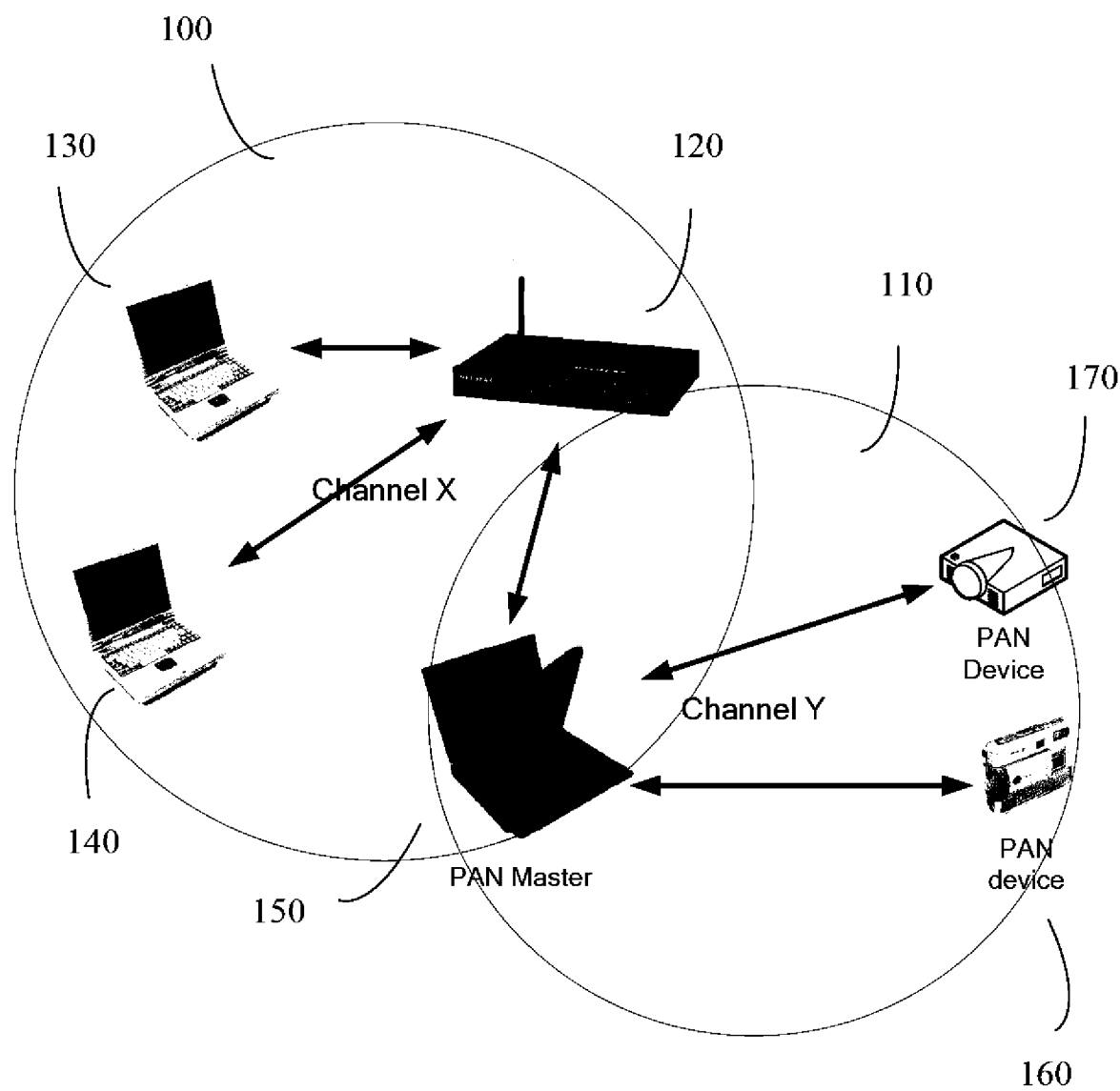
FIG. 1 is a schematic diagram illustrating wireless communication devices operating in two wireless communication networks according to some embodiments of the present invention.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to coordinating Time Division Multiple Access (TDMA) operation of wireless communication devices in wireless communication networks. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of coordinating Time Division Multiple Access (TDMA) operation of wireless communication devices in wireless communication networks as herein described. The non-processor circuits may include, but are not limited to, a radio receiver, a radio transmitter, signal drivers, clock circuits, power source circuits, and user input devices. As such, these functions may be interpreted as a method for coordinating Time Division Multiple Access (TDMA) operation of wireless communication devices in wireless communication networks. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1 and in accordance with embodiments of the present invention, a schematic diagram illustrates a first wireless communication network 100 operating on a first communication channel, channel X, and a second wireless communication network 110 operating on a second communication channel, channel Y. FIG. 1 shows the first and second wireless communication networks 100, 110 comprising a plurality of wireless communication devices in which embodiments of the present invention can be implemented and to which embodiments of the present invention are applicable. Examples of such wireless communication devices include, but are not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices. Such devices are equipped with wireless Network Interface Cards (NICs) and can comprise multiple virtual Media Access Controls (MACs).

According to some embodiments, the first wireless communication network 100 is in the form of a Wireless Local Area Network (WLAN) Basic Service Set (BSS) comprising a wireless access point (AP) 120 and three clients, which are in the form of laptop computers 130, 140 and 150 in this example. The second wireless communication network 110 is in the form of a Private Area Network (PAN) Basic Service Set (BSS) comprising a wireless AP identified as the PAN Master and two clients in the form of a digital camera 160 and a digital projector 170. In the example shown in FIG. 1, the laptop computer 150 operating as a client of the first wireless communication network 100 is also operating as the AP for the second wireless communication network 110.

The IEEE 802.11h standard and subsequent 802.11 standards comprise a Quiet element, or information element (IE), that defines an interval, or Quiet Period, during which no transmissions shall occur on the current communication channel. The Quiet Period may be utilised, for example, for making channel measurements without interference from other stations. The Quiet element can be included in Target Beacons (TBs) and in probe response frames sent by the AP of a network. The Quiet element comprises a Quiet Count field, which is set to the number of Target Beacon Transmission Times (TBTTs) until the beacon interval during which the next Quiet Period will start. The Quiet element also comprises a Quiet Offset field, which is set to the offset of the start of the Quiet Period from the TBTT. The value of the Quiet Offset field is less than one beacon interval.

To address, or at least minimize, the aforementioned prior art problems, embodiments of the present invention comprise a method and apparatus for coordinating TDMA operation of wireless communication devices operating on a communication channel which include an AP announcing a Quiet Period to one or more clients of the AP and transmitting an indication as part of a Target Beacon or probe response to the one or more clients. The indication indicates that the AP will be absent from the communication channel for one or more periods of time. The one or more clients can therefore establish, on the basis of the indication, a connection with the AP after the Quiet Period when the AP is next present on the communication channel.

Consider FIG. 1 and the laptop computer 150 identified as the PAN Master operating as an AP in the second wireless communication network 110. According to some embodiments, when a station in the form of a client, such as client 160, is searching for an access point, the client 160 transmits a probe request on the communication channel of the second wireless communication network 110, in this case channel Y, in search of a probe response from a suitable access point. When the laptop computer 150 comprising a virtual MAC is operating as an AP on channel Y and detects the probe request, the AP transmits one or more probe responses on channel Y with broadcast receiver addresses. The probe responses are transmitted, for example, every 10-20 ms during time slots in the TDMA operation in which the AP resides on channel Y. The probe responses include indications of when the AP will be absent from the communication channel, channel Y. The clients 160, 170 can therefore establish, on the basis of the indications, a connection with the AP when the AP is next present on the communication channel of the second wireless communication network 110.

Figure 2:
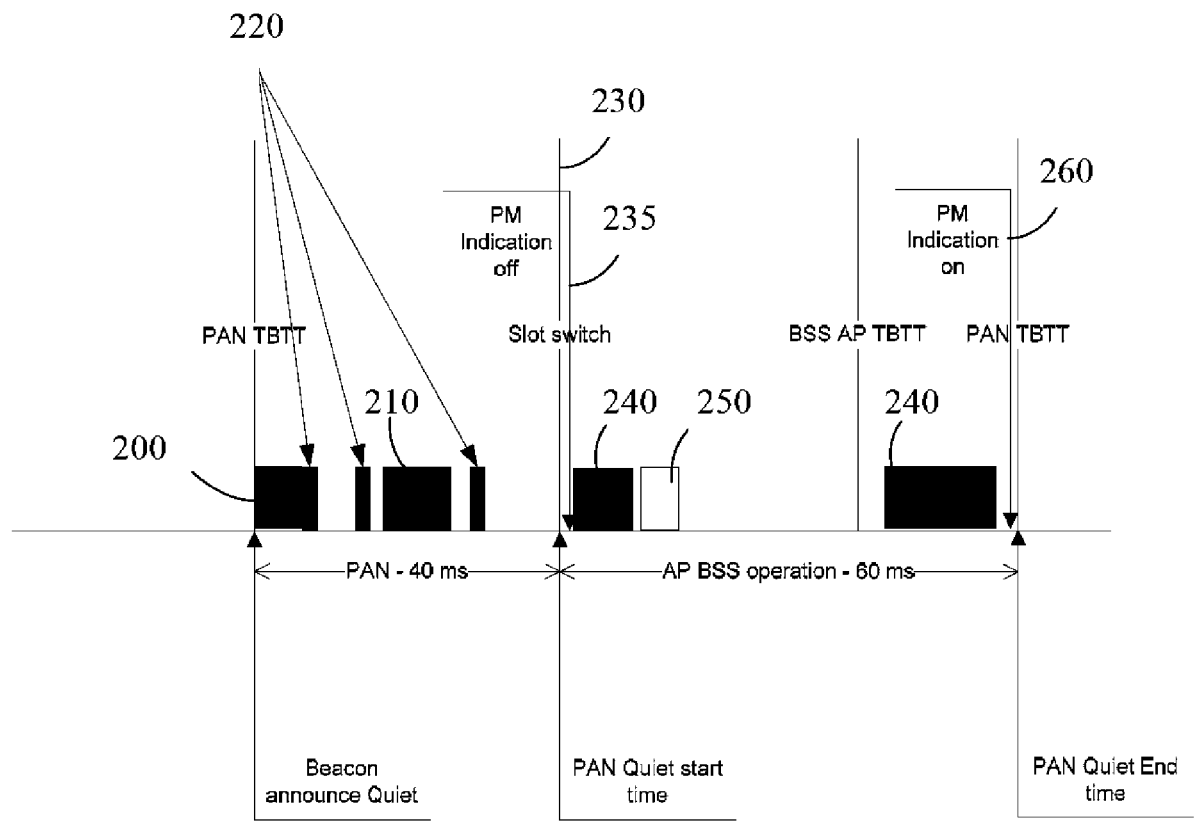
FIG. 2 is a schematic timing diagram illustrating a broadcast probe response sequence according to embodiments of the present invention.

Referring to the schematic timing diagram shown in FIG. 2, according to some embodiments, a Quiet Period is announced as part of a Target Beacon for the second communication network 110 in the form of the PAN at the PAN TBTT. Operation of the laptop computer 150 as the PAN AP is shown in FIG. 2 by an AP transmission 200 and an AP reception 210. The PAN AP transmits, in this example, a plurality of probe responses 220 on channel Y with broadcast receiver addresses whilst the PAN AP resides on channel Y. As described above, the probe responses include indications of when the PAN AP will be absent from channel Y. In this example, the laptop computer 150 operates in the PAN for a period of 40 ms from the PAN TBTT after which time there is a slot switch 230 as part of the TDMA operation. After the slot switch 230, the laptop computer 150 transmits a Power Management (PM) off indication 235 to the AP 120 of the first communication network 100 to indicate to the AP 120 that the laptop computer 150 is "awake," i.e., available. The indication 235 is typically included in the header of a Null data MAC frame. The laptop computer 150 is now operating as a client of the AP 120 in the first communication network 100 on channel X, as indicated by WLAN BSS client transmissions 240 and WLAN BSS client reception 250. The slot switch 230 coincides with commencement of the Quiet Period previously announced at the PAN TBTT such that the PAN clients 160, 170 of the AP will not transmit during the Quiet Period, i.e., whilst the laptop computer 150 operating as the PAN AP is absent from the second communication network 110. Following transmission of a Target Beacon from the BSS AP 120 at BSS AP TBTT, laptop computer 150 transmits a Power Management (PM) on indication 260 to the AP 120 to indicate to the AP 120 that the laptop computer 150 is in power save mode or "asleep," i.e., unavailable for the first communication network 100. Laptop computer 150 returns to the PAN and transmits another Target Beacon at the next PAN TBTT, which coincides with the end of the Quiet Period. In this example, laptop computer 150 operates as a client of the BSS AP 120 for a period of 60 ms before returning to the PAN and operating as the PAN AP.

According to some embodiments, the Target Beacon can comprise multiple Quiet elements announcing multiple Quiet Periods over a single Target Beacon interval thus allowing multiple slots between the first and second communication networks 100, 110 over a single Target Beacon interval.

Since the multiple virtual MAC of the wireless communication device does not reside on the AP communication channel for the whole time, embodiments of the present invention enable the probing sequence to be conducted regardless of the specific virtual MAC of the wireless NIC active at the time the probing sequence takes place. The virtual MAC operating when the probing sequence occurs may be active on a different communication channel from the communication channel used by the virtual MAC operating as an AP. Therefore, according to some embodiments of the present invention, when the client searching for an access point transmits a probe request, the probe request includes a capability indicator indicating whether the respective client can perform a probing sequence on another communication channel. Upon receiving the probe request from the client, the AP in the form of a virtual MAC AP transmits an indication of an alternative communication channel to be used by the AP when the AP is absent from the communication channel. The virtual MAC AP can also transmit the one or more indications of when the AP will be absent from the communication channel. The clients can therefore establish, on the basis of the indication, a connection with the access point when the access point is next present on the communication channel.

Figure 3:
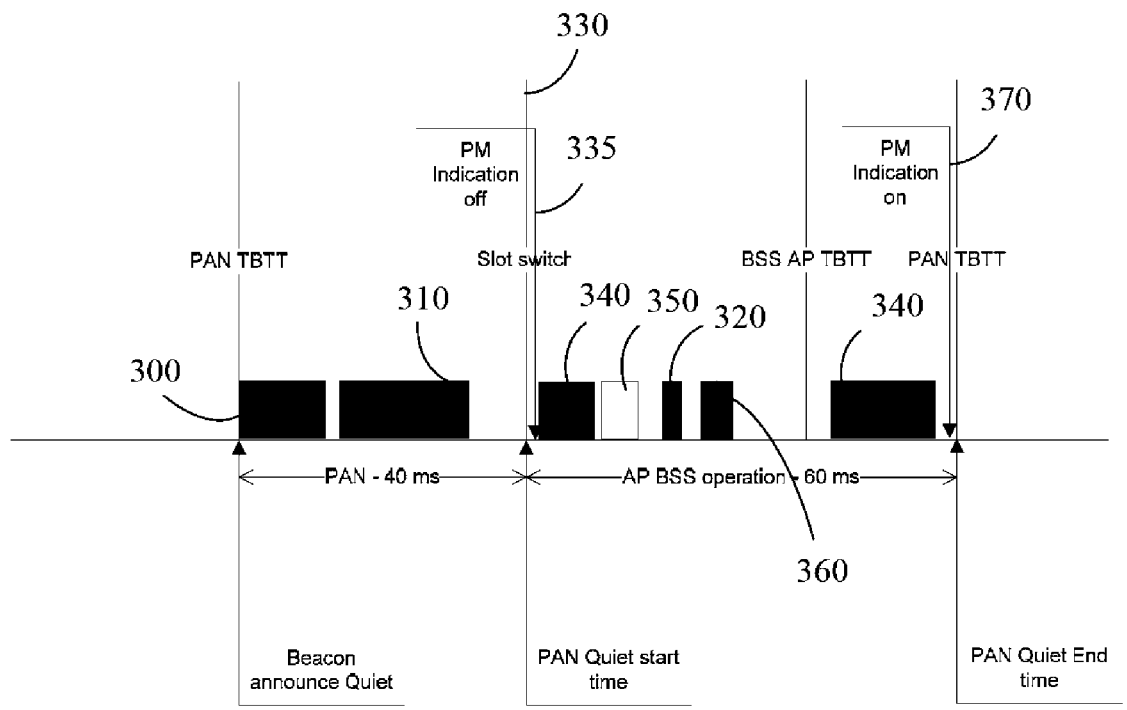
FIG. 3 is a schematic timing diagram illustrating a probing sequence outside a working channel of an access point according to embodiments of the present invention.

With reference to the schematic timing diagram shown in FIG. 3, a Quiet Period is announced as part of a Target Beacon for the second communication network 110 in the form of the PAN at the PAN TBTT. Operation of the laptop computer 150 in this example as the PAN AP is represented in FIG. 3 by a PAN AP transmission 300 and a PAN AP reception 310. As with the previous example, in this example, the laptop computer 150 operates in the PAN for a period of 40 ms after the PAN TBTT after which time there is a slot switch 330 as part of the TDMA operation. Laptop computer 150 transmits a Power Management (PM) off indication 335 to the AP 120 of the first communication network 100 after the slot switch 330 to indicate to the AP 120 that the laptop computer 150 is "awake," i.e., available. The laptop computer 150 is now operating as a client of the AP 120 in the WLAN 100 on channel X, as indicated by WLAN BSS client transmissions 340 and WLAN BSS client reception 350. The slot switch 330 coincides with commencement of the Quiet Period previously announced at the PAN TBTT such that the PAN clients 160, 170 of the AP will not transmit during the Quiet Period on channel Y of the PAN. However, PAN clients 160, 170 that are capable of conducting a probing sequence on a communication channel other than channel Y can transmit a probe request 320 on another communication channel, i.e., on channel X in this example, the communication channel of the first communication network 100. The PAN AP, in this example laptop 150, which is temporarily absent from the PAN and therefore not currently operating as the PAN AP, responds to the probe request(s) 320 of the PAN clients 160, 170 with a probe response 360 on channel X. The probe response 360 can include the alternative working communication channel and indications identifying when the PAN AP will be absent from the PAN communication channel, channel Y. In this example, laptop computer 150 operates as a client of the BSS AP 120 for a period of 60 ms before returning to the PAN and operating as the PAN AP. Prior to returning to the PAN, laptop computer 150 transmits a Power Management (PM) on indication 370 to the AP 120 to indicate to the AP 120 that the laptop computer 150 is in power-save mode or "asleep," i.e. unavailable.

According to some embodiments of the present invention, the aforementioned probe requests transmitted by clients, such as clients 160, 170, can include a respective capability indicator. The capability indicator of each client is indicative of whether a respective client can support the Quiet Period. The capability indicator can be included as part of the MAC association request frame and can indicate support for the Quiet Period on the 2.4 GHz band and/or the 5.2 GHz band. When the virtual MAC operating as an AP receives the association requests from the clients, the AP is thus informed of whether all, only some, or none of the clients support the Quiet Period. In accordance with the present invention, the AP can therefore select the appropriate protection method to employ when the AP is going to be absent from the network.

Where all clients support the Quiet Period, the AP only announces the Quiet Period for the second virtual MAC operation. If only some or none of the clients support the Quiet Period, in addition to announcing the Quiet Period, a Clear-To-Send-To-Self (CTS-To-Self) signal is also transmitted, as described in more detail hereinafter, in order to maintain TDMA operation for the clients that do not support the Quiet Period. Also, the clients that do support the Quiet Period can utilize the Quiet Period to enter a power-save mode, which enables better network utilization.

Figure 4:
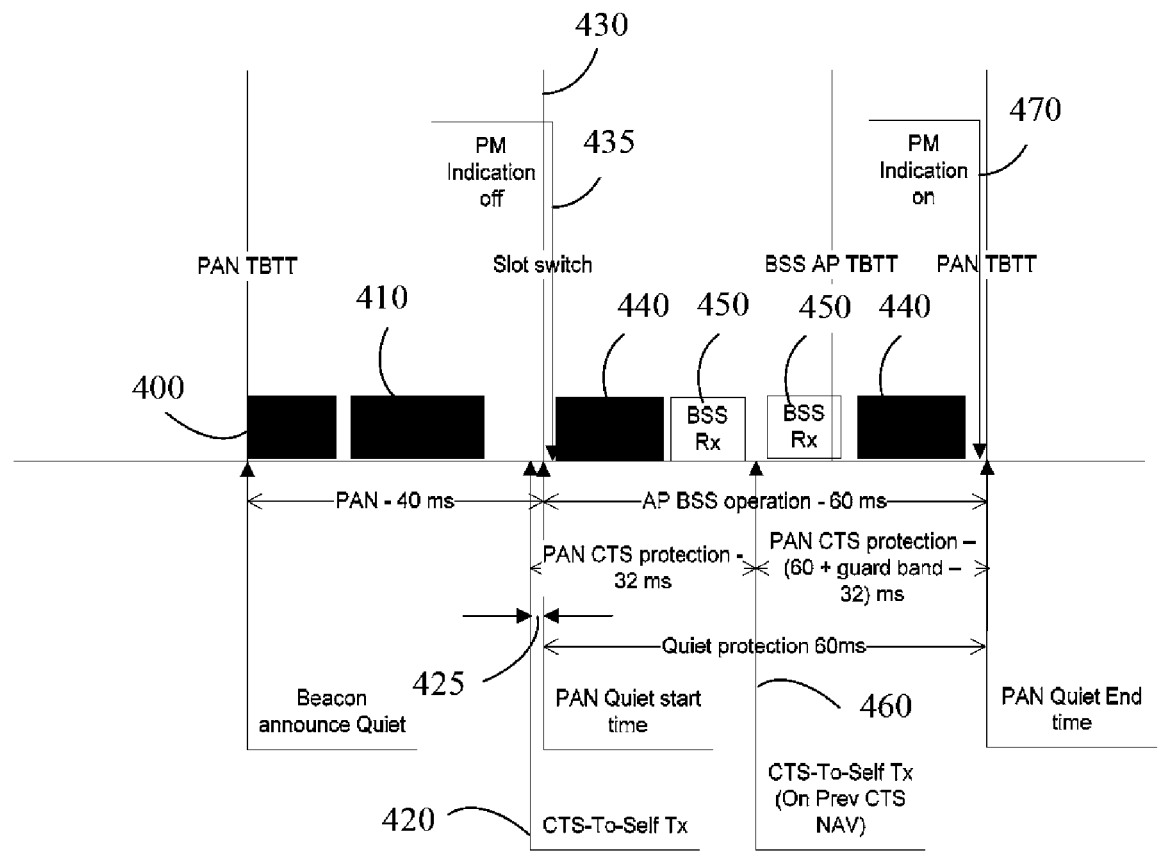
FIG. 4 is a schematic timing diagram illustrating protected slotted operation between two wireless communication networks according to embodiments of the present invention.

With reference to FIG. 4 and in accordance with embodiments of the present invention, the PAN AP, in this example laptop computer 150 shown in FIG. 1, announces that it needs to be absent from the PAN by transmitting a Target Beacon comprising a Quiet element at the PAN TBTT. A PAN AP transmission 400 and reception 410 occur prior to the TDMA slot switch 430, which takes place 40 ms after the PAN TBTT and coincides with the commencement of the Quiet Period. Laptop computer 150 transmits a Power Management (PM) off indication 435 to the AP 120 of the first communication network 100 after the slot switch 330 to indicate to the AP 120 that the laptop computer 150 is "awake," i.e., available.

In cases where the PAN AP receives a probe request containing a capability indicator indicating at least one client does not support the Quiet Period, prior to the slot switch 430 and commencement of the Quiet Period, the PAN AP includes a CTS-To-Self signal 420 for Network Allocation Vector (NAV) protection. A NAV is maintained by each station and is indicative of time periods when transmissions will not be initiated even when the communication channel is clear. As shown in FIG. 4, the CTS-To-Self signal 420 is transmitted a guard time 425 prior to commencement of the Quiet Period. In this example, the duration of the PAN CTS protection period is 32 ms and the duration of the Quiet Period is 60 ms. If any regular data frames are transmitted after transmission of the CTS-To-Self signal 420 by the PAN AP, such frames will be of a duration correlating to the remaining duration defined by the CTS-To-Self signal 420. The maximum possible announced NAV duration in a MAC frame is 32 ms. Therefore, if the PAN AP wants to protect a duration which is longer than 32 ms, the PAN AP needs to send an additional CTS-To-Self frame with the remaining duration, in this example (60−32)=28 ms. In order to avoid the guard time 425, the AP takes advantage of the previous CTS-To-Self frame and sends the next CTS-To-Self frame prior to the ending of the 32 ms of the NAV duration, as discussed further below.

At the TDMA slot switch 430, the laptop computer 150 operating as the PAN AP leaves the second communication network 110 operating on channel Y and joins the first communication network 100 operating on channel X as a client of the WLAN BSS AP 120. FIG. 4 shows WLAN transmissions 440 from the laptop computer 150 operating as a client and receptions 450. The PAN AP operates according to the Quiet Period defined in the IEEE 802.11 standard with the exception of allowing the NAV extension referred to above, which is achieved by the AP transmitting a further CTS-To-Self signal 460 during the Quiet Period. The further CTS-To-Self signal 460 is transmitted when a transmission is transmitted from a client after the guard time 425 prior to commencement of the Quiet Period. The NAV extension transmission takes place within the previously defined NAV period, thus creating a NAV extension without allowing the one or more clients to transmit. In this example, the further CTS-To-Self signal 460 defines a protection duration equal to the Quiet Period of 60 ms, plus the guard time 425, minus the duration of the previous CTS-To-Self signal 420 of 32 ms. Prior to returning to the PAN, laptop computer 150 transmits a Power Management (PM) on indication 470 to the AP 120 to indicate to the AP 120 that the laptop computer 150 is in power save mode or "asleep," i.e., unavailable as a client of the first communication network 100.

Figure 5:
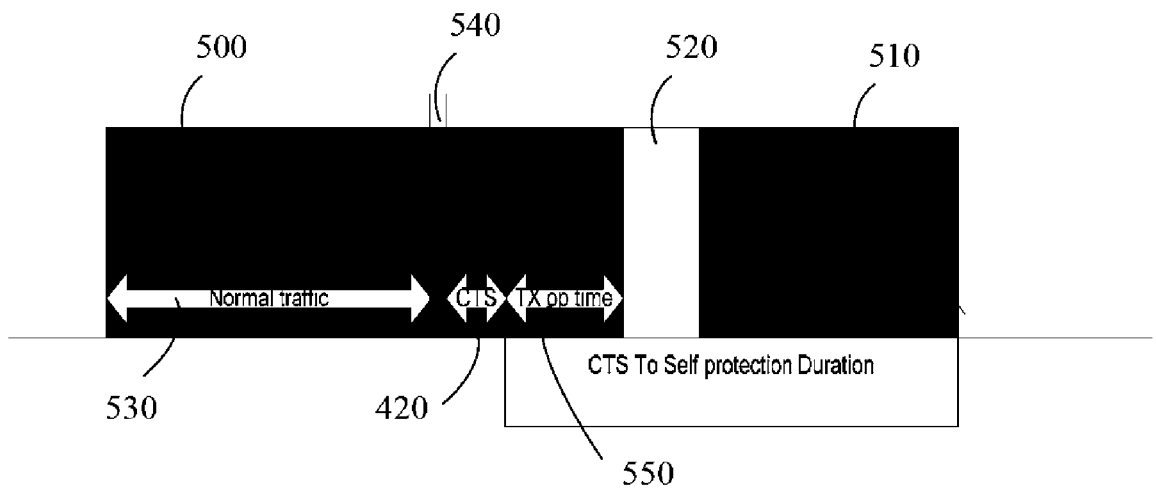
FIG. 5 is a schematic timing diagram illustrating transmissions from an access point according to embodiments of the present invention.

Further detail of the CTS-To-Self signal 420 will now be described with reference to FIG. 5, which represents transmissions of, for example, the laptop computer 150, operating as the PAN AP during the PAN time 500 and operating as a client of the WLAN BSS AP 120 during the WLAN BSS time 510. A transition time 520 exists between the laptop computer 150 operating in the two different networks 110, 100 on two different channels, channel Y and channel X respectively. Following a normal traffic period 530, the CTS-To-Self signal 420 is transmitted by the PAN AP a Priority Interframe Space (PIFS) time 540 after any transmission sent by a client after the guard time 425. The CTS-To-Self protection period is shown in FIG. 5 extending into the WLAN BSS time 510 when the laptop computer 150 is operating as a client of the WLAN BSS AP 120. FIG. 5 also shows a transmission opportunity time 550 in which a burst of frames can be transmitted without interruption.

In some alternative embodiments, the AP transmits a Delivery Traffic Indication Message (DTIM) information element to clients in power save mode prior to announcing the Quiet Period at the TBTT and the AP remains on the communication channel. The DTIM comprises a DTIM Count and a DTIM Period and indicates that there is pending traffic for the clients that are in power save mode, thus tempting or inviting the one or more clients in power save mode to transmit during the Quiet Period. The AP identifies each client from which a transmission is received during the Quiet Period as a client that does not support the Quiet Period.

Hence, in some embodiments, when the AP is absent from the communication channel, rather than the AP joining another channel, either as an AP or as a client, the AP and/or one or more of the clients can enter a power save mode.

According to some embodiments of the present invention, the multi virtual MAC can comprise three or more virtual MACs and the methods and apparatus described herein can be utilized to coordinate TDMA operation of wireless communication devices on multiple channels.

Figure 6:
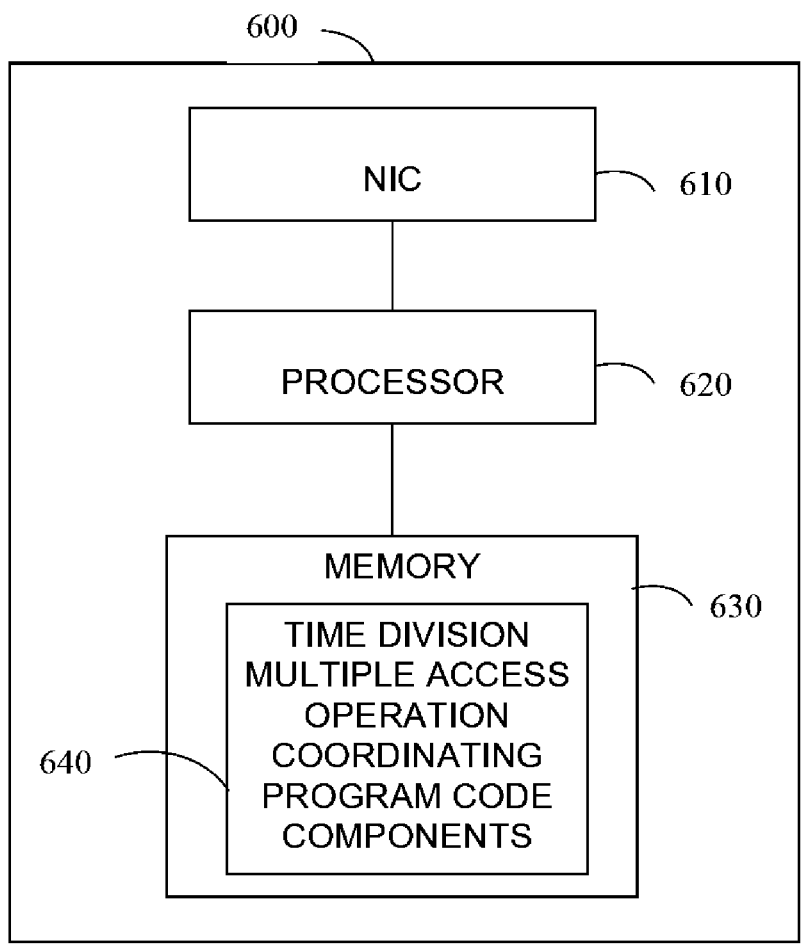
FIG. 6 is a schematic diagram illustrating components of an apparatus according to embodiments of the present invention.

Referring to FIG. 6, a schematic diagram illustrates some of the components of an apparatus 600, such as the wireless communication devices described herein, according to some embodiments of the present invention. As described above, each apparatus 600 comprises a physical wireless Network Interface Card (NIC) 610, which can operate in multiple virtual MACs mode, coupled to a processor 620, such as a standard microprocessor, ASIC, FPGA or the like for implementing embodiments of the invention as described herein. For example, processor 620 can be operatively coupled to a storage medium in the form of a memory 630. The memory 630 comprises a computer-readable medium, such as a random access memory (e.g., static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for the said type of storage, as is well known in the art. The computer-readable medium comprises computer-readable program code components 640 for coordinating Time Division Multiple Access (TDMA) operation of wireless communication devices in wireless communication networks in accordance with the teachings of the present invention, at least some of which are selectively executed by the processor 620 and are configured to cause the execution of the embodiments of the present invention described herein.

Advantages of the various embodiments of the present invention thus include coordinating Time Division Multiple Access (TDMA) operation of wireless communication devices in wireless communication networks when the access point of one of the networks needs to leave the channel for some reason, such as joining another communication network or adopting a power save mode. Hence, the likelihood of clients assuming that the access point has dropped out when it is temporarily absent from the communication network and consequently initiating a roaming procedure is reduced. Embodiments of the present invention take into account capability indicators of the clients, such as their ability to support the Quiet Period and/or a probing sequence on a channel other than the working channel of the access point such that the most appropriate protection method can be employed. Discovery of access points by clients is thus improved by virtue of embodiments of the present invention. Discovery of possible clients by the access point is also improved. Embodiments of the present invention enable simultaneous operation of a first virtual MAC operating as an access point in a first communication network and a second virtual MAC operating as a client, or another access point, in a second communication network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method, comprising:
   announcing by an access point a Quiet Period to one or more clients of the access point, the access point being an access point for a wireless communications network;
   transmitting by the access point an indication to the one or more clients that the access point will be absent from the communication channel for a period of time, the indication transmitted as part of a Target Beacon or a probe response; and
   establishing a connection between the access point and the one or more clients after the Quiet Period when the access point is present on the communication channel on the basis of the indication.

2. The method of claim 1, further comprising:
   transmitting by the one or more clients a respective capability indicator to the access point as part of an association request, the capability indicator of each client indicative of whether a respective client can support the Quiet Period.

3. The method of claim 2, further comprising:
transmitting by the access point a Clear-To-Send-To-Self signal in which the capability indicator indicates that at least one client does not support the Quiet Period thereby maintaining Time Division Multiple Access operation for the at least one client that does not support the Quiet Period.

4. The method of claim 3, further comprising:
transmitting the Clear-To-Send-To-Self signal a guard time prior to commencement of the Quiet Period.

5. The method of claim 3, further comprising:
transmitting by the access point a further Clear-To-Send-To-Self signal during the Quiet Period when a transmission is transmitted from a client after a guard time prior to commencement of the Quiet Period.

6. The method of claim 2, wherein:
the capability indicator indicates whether a respective client can perform a probing sequence on another communication channel.

7. The method of claim 1, further comprising:
transmitting by the access point to the one or more probing clients an indication of an alternative communication channel to be used by the access point when the access point is absent from the communication channel.

8. The method of claim 1, further comprising:
transmitting by the access point a Delivery Traffic Indication Message information element during the Quiet Period to the one or more clients that are in a power-save mode to invite the one or more clients in the power-save mode to transmit during the Quiet Period.

9. The method of claim 8, further comprising:
identifying by the access point each client from which a transmission is received during the Quiet Period as a client that does not support the Quiet Period.

10. The method of claim 1, further comprising:
joining by the access point another wireless communication network whilst absent from the communication channel or the access point and/or one or more of the clients entering a power-save mode whilst the access point is absent from the communication channel.

11. An article comprising: a non-transitory computer-readable medium having stored thereon instructions that, if executed, result in at least the following:
announcing by an access point a Quiet Period to one or more clients of the access point, the access point being an access point for a wireless communications network;
transmitting by the access point an indication to the one or more clients that the access point will be absent from the communication channel for a period of time, the indication transmitted as part of a Target Beacon or a probe response; and
establishing a connection between the access point and the one or more clients after the Quiet Period when the access point is present on the communication channel on the basis of the indication.

12. The article of claim 11, further comprising:
transmitting by one or more clients a respective capability indicator to the access point as part of an association request, the capability indicator of each client indicative of whether a respective client can support the Quiet Period.

13. The article of claim 12, further comprising:
transmitting by the access point a Clear-To-Send-To-Self signal in which the capability indicator indicates that at least one client does not support the Quiet Period thereby maintaining Time Division Multiple Access operation for the at least one client that does not support the Quiet Period.

14. The article of claim 13, further comprising:
transmitting the Clear-To-Send-To-Self signal a guard time prior to commencement of the Quiet Period.

15. The article of claim 13, further comprising:
transmitting by the access point a further Clear-To-Send-To-Self signal during the Quiet Period when a transmission is transmitted from a client after a guard time prior to commencement of the Quiet Period.

16. The article of claim 12, wherein
the capability indicator indicates whether a respective client can perform a probing sequence on another communication channel.

17. The article of claim 11, further comprising:
transmitting by the access point to the one or more probing clients an indication of an alternative communication channel to be used by the access point when the access point is absent from the communication channel.

18. The article of claim 11, further comprising:
transmitting by the access point a Delivery Traffic Indication Message information element during the Quiet Period to the one or more clients that are in a power-save mode to invite the one or more clients in the power-save mode to transmit during the Quiet Period.

19. The article of claim 18, further comprising:
identifying by the access point each client from which a transmission is received during the Quiet Period as a client that does not support the Quiet Period.

20. The article of claim 11, further comprising:
joining by the access point another wireless communication network whilst absent from the communication channel or to cause the access point and/or one or more of the clients entering a power save mode whilst the access point is absent from the communication channel.

21. An access point for a wireless communications network, the access point comprising: a network interface device capable of announcing a Quiet Period to one or more clients of the access point, and capable of transmitting an indication as part of a Target Beacon or probe response to the one or more clients of the access point that the access point will be absent from the communication channel for a period of time, and capable of establishing, on the basis of the indication, a connection with the one or more clients after the Quiet Period when the access point is present on the communication channel.

* * * * *